United States Patent [19]

Brunelle

[11] 4,452,970

[45] Jun. 5, 1984

[54] CATALYTIC PROCESS FOR PREPARING POLY(ALKYLENE DICARBOXYLATES) AND CATALYSTS FOR USE THEREIN

[75] Inventor: Daniel J. Brunelle, Scotia, N.Y.

[73] Assignee: General Electric Company, Schenectady, N.Y.

[21] Appl. No.: 502,435

[22] Filed: Jun. 9, 1983

[51] Int. Cl.³ .................... C08G 63/04; C08G 63/34
[52] U.S. Cl. ................................................ 528/279
[58] Field of Search ...................................... 528/279

[56] References Cited

U.S. PATENT DOCUMENTS

| | | | |
|---|---|---|---|
| 3,444,139 | 5/1969 | Jeurissen et al. | 528/279 |
| 4,148,989 | 4/1979 | Tews et al. | 528/296 X |
| 4,260,735 | 4/1981 | Bander et al. | 528/279 |

FOREIGN PATENT DOCUMENTS 891679 12/1981 U.S.S.R.

OTHER PUBLICATIONS

*Polymer Eng. & Science,* 22, pp. 229–233, (1982).
*Chem. Abstracts,* 83, 148316s, (1975).
*Chem. Abstracts,* 84, 44989t, (1976).

*J. Inorg. Nucl. Chem.,* 21, pp. 58–63, (1961).

*Primary Examiner*—Lucille M. Phynes
*Attorney, Agent, or Firm*—William H. Pittman; James C. Davis, Jr.; James Magee, Jr.

[57] ABSTRACT

Poly(alkylene dicarboxylates) such as poly(alkylene terephthalates) are prepared by reacting a dicarboxylic acid or alkyl ester thereof with an alkanediol in the presence of a titanium-containing chelate compound which may be prepared by the reaction of a tetraalkyl titanate with an ortho-disubstituted hydroxyaromatic compound of the formula

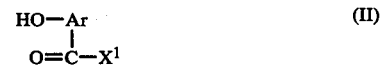

(II)

wherein $X^1$ is hydrogen, lower alkyl or lower aryl. Polymerization by this method minimizes ester-carbonate interchange in blends of the poly(alkylene dicarboxylates) with aromatic polycarbonates. The chelates in which $X^1$ is lower alkyl or lower aryl are novel compounds.

12 Claims, No Drawings

CATALYTIC PROCESS FOR PREPARING POLY(ALKYLENE DICARBOXYLATES) AND CATALYSTS FOR USE THEREIN

This invention relates to an improved process for preparing poly(alkylene dicarboxylates) and compositions useful therein, and more particularly a process which employs an improved titanium-containing catalyst. In its broadest sense, the process of this invention is an improvement in a process for preparing poly(alkylene dicarboxylates) by the reaction of at least one dicarboxylic acid or alkyl ester thereof with at least one alkanediol in the presence of a titanium-containing catalyst; said improvement comprising using as said catalyst a compound having the formula

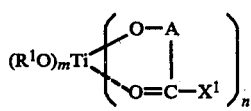
(I)

wherein each $R^1$ is an alkyl radical having up to about 20 carbon atoms; A is an aromatic hydrocarbon-based radical in which the —O— and

moieties occupy ortho positions; $X^1$ is hydrogen, lower alkyl or lower aryl; n is 1 or 2; and m is 4−n.

Blends of poly(alkylene dicarboxylates) and poly(arylene carbonates) (also known as aromatic polycarbonates and referred to hereinafter as "polycarbonates") are widely used in industry. A disadvantage of these blends, however, that inhibits their use to some degree is their tendency to undergo ester-carbonate interchange. In this interchange, ester linkages in both the polycarbonate and the poly(alkylene dicarboxylate) are broken and may be replaced by alkylene carbonate and aryl carboxylate bonds. The result is degradation of the physical properties of the polymer due to hybridization of the molecular linkages therein.

It has been suggested that ester-carbonate interchange is promoted by the presence in the poly(alkylene dicarboxylate) of traces of titanium compounds used to catalyze polymerization. Apparently these titanium compounds, chiefly tetraalkoxy titanates, are also effective in catalyzing a transesterification reaction between the polycarbonate and the poly(alkylene dicarboxylate).

A principal object of the present invention, therefore, is to provide an improved process for preparing poly(alkylene dicarboxylates).

A further object is to provide such a process employing a titanium-containing catalyst which does not promote ester-carbonate interchange when present in trace amounts in blends of the poly(alkylene dicarboxylate) with a polycarbonate.

Other objects will in part be obvious and will in part appear hereinafter.

The process of this invention is applicable to the preparation of poly(alkylene dicarboxylates) by the reaction of at least one alkenediol with at least one dicarboxylic acid or ester thereof. Typical alkanediols which may be used in this reaction are those having the formula HO—$R^2$—OH, wherein $R^2$ is a saturated divalent aliphatic or alicyclic hydrocarbon radical containing about 2-10 and usually about 2-6 carbon atoms. Illustrative radicals of this type are ethylene, propylene, trimethylene, tetramethylene, pentamethylene, hexamethylene and 1,4-cyclohexylene. The straight-chain radicals are preferred, especially ethylene, trimethylene and tetramethylene, but branched radicals are also contemplated.

The dicarboxylic acid may be an aliphatic acid such as succinic, glutaric, adipic, sebacic, azelaic or suberic acid, or an aromatic acid such as isophthalic or terephthalic acid. The aromatic acids, especially terephthalic acid, are preferred. The use of an alkyl ester, usually a lower alkyl ester, is especially preferred, the term "lower alkyl" denoting alkyl groups having up to 7 carbon atoms; it is most often a methyl, ethyl or butyl ester. (The term "alkyl dicarboxylate" as used herein refers to the dialkyl ester.) Further suitable reagents for forming poly(alkylene dicarboxylates) are described in the following U.S. Pat. Nos.: 2,465,319, 2,720,502, 2,727,881, 2,822,348, 3,047,539. The disclosures of these parents are incorporated by reference herein.

According to the present invention, the polyester-forming reaction is catalyzed by a titanium compound having formula I. In this formula, the $R^1$ value is an alkyl radical having up to about 20 and typically about 4–10 carbon atoms, such as ethyl, 1-propyl, 1-butyl, 1-hexyl, 1-octyl, 1-decyl, 2-decyl, 2-ethylhexyl or the like. The $X^1$ value is hydrogen, lower alkyl or lower aryl; it is most often lower aryl, preferably phenyl or substituted phenyl wherein the substituents are electron-donating groups such as alkyl, hydroxy or alkoxy (especially lower alkoxy). Usually, no more than two such substituents will be present per aromatic ring, and they will be in the ortho and para positions with respect to the

group. Hydroxy substituents are especially preferred.

The A value is a divalent aromatic hydrocarbon-based radical in which —O— and

occupy ortho (i.e., adjacent) positions. The term "divalent aromatic hydrocarbon-based radical" as used herein denotes a divalent aromatic radical having predominantly hydrocarbon character within the context of this invention. Such radicals include the following:

(1) Hydrocarbon radicals; that is, aromatic and aliphatic-substituted aromatic radicals and the like. Such radicals are known to those skilled in the art; examples are phenylene, tolylene, xylylene and naphthylene.

(2) Substituted hydrocarbon radicals; that is, radicals containing non-hydrocarbon substituents which, in the context of this invention, do not alter the predominantly hydrocarbon character of the radical. Electron-donating groups are preferred; their identity and location is usually as described hereinabove with reference to the $X^1$ value.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur. Thus, heterocyclic compounds from which A may be derived include such compounds as pyrrole, thiophene, furan, pyridine and 4-pyrone.

The A radical is usually a substituted or unsubstituted o-phenylene radical. As previously noted, any substituents are preferably electron-donating; hydroxy substituents are especially preferred. Up to two —OH and —O—Ti groups may be present for each aromatic ring in the compound of formula I.

The titanium compounds of formula I may be obtained by the reaction of a tetraalkyl titanate of the formula $(R^1O)_4Ti$ with a hydroxyaromatic compound of the formula

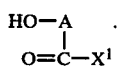  (II)

Illustrative compounds of formula II are salicylaldehyde, o-hydroxyacetophenone, o-hydroxybenzophenone, 2,4-dihydroxybenzophenone, 2,4,4'-trihydroxybenzophenone, 2,4,2',4'-tetrahydroxybenzophenone and dehydroacetic acid (which in its tautomeric structure as 2-hydroxy-3-acetyl-6-methyl-4-pyrone is a heterocyclic aromatic compound for the purpose of this invention).

The reaction is normally effected by merely blending the titanate and hydroxyaromatic compound at a temperature in the range of about 20°–100° C. and agitating for a time sufficient for the reaction to take place. The molar ratio of hydroxyaromatic compound to tetraalkyl titanate is usually from about 1:1 to about 2.5:1; most often is is from 1:1 to 2:1 and preferably either 1:1 or 2:1 depending on whether the desired value of n in the product is 1 or 2. It is frequently convenient to effect the reaction in the presence of an organic solvent such as benzene, toluene, petroleum naphtha, hexane, ethanol, acetone, tetrahydrofuran or the like.

It is also within the scope of this invention to prepare the compound of formula I in situ during or just before the polymerization reaction. This is easily done by preparing a conventional reaction mixture for the preparation of poly(alkylene dicarboxylates), including a tetraalkyl titanate, and adding thereto a compound of formula II.

As indicated by formula I, the product of the reaction between the tetraalkyl titanate and the hydroxyaromatic compound is normally a chelate compound involving the carbonyl group in the ortho or 2-position to the hydroxy radical. The chelate nature of the compound is an important aspect of the invention, since it is believed to account for the decreased activity of the titanium compound with respect to ester-carbonate interchange.

Novel compositions comprising titanium chelate compounds having the formula

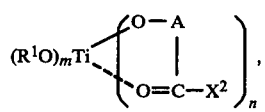  (III)

wherein $R^1$, A, m and n are as previously defined and $X^2$ is lower alkyl or lower aryl, are another embodiment of the invention. Such compounds are prepared and used as described hereinabove.

In the process of this invention, the dicarboxylic acid or ester thereof, alkanediol and titanium-containing catalyst are heated in the range of about 180°–300° C. for a period of time sufficient to produce the desired poly(alkylene dicarboxylate). The mole ratio of diol to acid or ester is typically from about 1:1 to about 1.4:1 and preferably from about 1.2:1 to about 1.3:1, the excess diol being useful to drive the reaction to completion. The amount of titanium-containing catalyst used is typically about 0.005–0.2 percent by weight, based on the amount of acid or ester.

The preparation of the above-described titanium-containing catalysts, including the titanium chelate compounds of this invention, and their use in the process of this invention are illustrated by the following examples.

EXAMPLE 1

A benzene solution of 2.8 grams (10 mmol.) of tetraisopropyl titanate and 2.5 grams (10 mmol.) of 2,4,2',4'-tetrahydroxybenzophenone is heated to boiling and the benzene is removed by distillation. The residue is the desired chelate compound containing one tetrahydroxybenzophenone moiety per molecule.

EXAMPLE 2

The procedure of Example 1 is repeated except that 5.0 grams (20 mmol.) of 2,4,2',4'-tetrahydroxybenzophenone is used. The residue is the desired chelate compound containing 2 tetrahydroxybenzophenone moieties per molecule.

EXAMPLE 3

A mixture of 5.7 grams (20 mmol.) of tetraisopropyl titanate and 3.0 grams (20 mmol.) of 2,4-dihydroxyacetophenone is stirred at room temperature for one hour and is then heated under vacuum at 75° C. The product is the desired chelate compound containing one dihydroxyacetophenone moiety per molecule.

EXAMPLE 4

The procedure of Example 1 is repeated, substituting o-hydroxybenzophenone on an equimolar basis for the tetrahydrobenzophenone. A similar product is obtained.

EXAMPLE 5

The procedure of Example 1 is repeated, substituting 2,4-dihydroxybenzophenone on an equimolar basis for the tetrahydroxybenzophenone. A similar product is obtained.

EXAMPLE 6

The procedure of Example 2 is repeated, substituting dehydroacetic acid on an equimolar basis for the tetrahydrobenzophenone. A similar product is obtained.

EXAMPLE 7

A mixture of 100 grams of dimethyl terephthalate, 40 grams of ethylene glycol and 0.03 gram of the product of Example 1 is heated at 200°–210° C. in a nitrogen atmosphere, with stirring, as methanol is removed by distillation. After methanol evolution has ceased, the mixture is heated at 270°–280° C. for about 15 minutes and then under vacuum at the same temperature for about 40 minutes. The product is the desired poly(ethylene terephthalate).

EXAMPLE 8

A mixture of 100 grams of dimethyl terephthalate, 40 grams of ethylene glycol, 0.03 gram of tetraisopropyl titanate and 0.15 gram of 2,4,2',4'-tetrahydroxybenzophenone is heated at 300°–310° C. in a nitrogen atmosphere, with stirring, as methanol is removed by distillation. After methanol evolution has ceased, the mixture is heated at 270°–280° C. for about 15 minutes and then under vacuum at the same temperature for about 40 minutes. The product is the desired poly(ethylene terephthalate).

EXAMPLE 9

The procedure of Example 7 is repeated, substituting 1,4-butanediol on an equimolar basis for the ethylene glycol and 0.03 gram of the product of Example 2 for the product of Example 1. The product is the desired poly(tetramethylene terephthalate).

Blends of the poly(alkylene dicarboxylates) produced by the method of this invention with polycarbonates are significantly less susceptible to ester-carbonate interchange than similar previously known blends. It is believed that this is a result of the decreased tendency of the compounds of formula I to catalyze such interchange when present in poly(alkylene dicarboxylate)-polycarbonate blends. Said compounds are, however, sufficiently active to serve as effective catalysts for poly(alkylene dicarboxylate) preparation.

What is claimed is:

1. In a process for preparing poly(alkylene dicarboxylates) by the reaction of at least one dicarboxylic acid or alkyl ester thereof with at least one alkanediol in the presence of a titanium-containing catalyst, the improvement which comprises using as said catalyst a compound having the formula

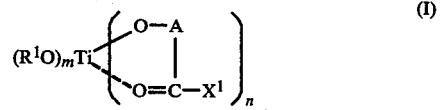 (I)

wherein each $R^1$ is an alkyl radical having up to about 20 carbon atoms; A is an aromatic hydrocarbon-based radical in which the —O— and

moieties occupy ortho positions; $X^1$ is hydrogen, lower alkyl or lower aryl; n is 1 or 2; and m is 4−n.

2. A process according to claim 1 wherein the dicarboxylic acid reagent is an alkyl ester of an aromatic dicarboxylic acid.

3. A process according to claim 2 wherein the alkanediol has the formula HO—$R^2$—OH, wherein $R^2$ is a saturated divalent aliphatic or alicyclic hydrocarbon radical containing about 2–10 carbon atoms.

4. A process according to claim 3 wherein $R^2$ is the ethylene, trimethylene or tetramethylene radical.

5. A process according to claim 4 wherein each aromatic ring in the compound of formula I is unsubstituted or contains up to two —OH and —O—Ti groups per aromatic radical.

6. A process according to claim 5 wherein $R^1$ has about 4–10 carbon atoms and X is phenyl or substituted phenyl.

7. A process according to claim 6 wherein n is 1.

8. A process according to claim 7 wherein the alkyl ester is a lower alkyl terephthalate.

9. A process according to claim 8 wherein the terephthalate is methyl terephthalate.

10. A process according to claim 6 wherein n is 2.

11. A process according to claim 10 wherein the alkyl ester is a lower alkyl terephthalate.

12. A process according to claim 11 wherein the terephthalate is methyl terephthalate.

* * * * *